United States Patent [19]
Cho

[11] Patent Number: 5,992,945
[45] Date of Patent: Nov. 30, 1999

[54] HYDRAULIC BRAKE FORCE REGULATING SYSTEM

[75] Inventor: Young Hwan Cho, Ulsan, Rep. of Korea

[73] Assignee: Hyundai Motor Company, Seoul, Rep. of Korea

[21] Appl. No.: 08/777,539

[22] Filed: Dec. 30, 1996

[30] Foreign Application Priority Data

Dec. 30, 1995 [KR] Rep. of Korea ............... 95-68949

[51] Int. Cl.⁶ ................................................ B60T 8/26
[52] U.S. Cl. ...................... 303/22.1; 303/22.8; 303/198
[58] Field of Search ................................. 303/198, 192, 303/22.1–22.8

[56] References Cited

U.S. PATENT DOCUMENTS 3,878,908  4/1975  Andersson et al. ............... 303/22.8
4,418,966  12/1983  Hattwig ............................ 303/198

*Primary Examiner*—Matthew C. Graham
*Attorney, Agent, or Firm*—Christie, Parker & Hale, LLP

[57] ABSTRACT

A hydraulic brake force regulating system controls the brake system of a vehicle such that substantially the same breaking power is applied to both wheels of an axle despite the presence of a biased load applied to the wheels. A pair of positioning sensors mounted on the axle to detect the level of inclination of the axle. An electronic controller between the positioning sensors and a control valve regulates the hydraulic oil transferred to the wheels on the axle. The electronic controller actuates a device for controlling the control valve based on a signal received from the electronic controller.

6 Claims, 3 Drawing Sheets

HYDRAULIC BRAKE FORCE REGULATING SYSTEM

FIELD OF THE INVENTION

The present invention relates to an apparatus for controlling the brake oil pressure in the brake system of a vehicle, and particularly to an apparatus for controlling the brake oil pressure of the left side brake system and the right side brake system at constant without having relation with the angle of the car body.

BACKGROUND OF THE INVENTION

Generally, a brake system of automotive vehicle restricts the rotation of wheels. The brake force stops or restricts the speed of the car.

The general brake system of vehicle, as shown in FIG. 1, has a mastercylinder 10 generating hydraulic pressure by stepping on the brake pedal 12, a brake shoe 14 or a calliper 16 which contacts with a drum 18 or a disk 20 of the car wheel and generates friction force, and a wheel cylinder 21 actuated by the hydraulic oil force from the master cylinder 10 and pushing the brake shoe 14 or the calliper 16 to the drum 18 or the disk 20.

Between the brake pedal 12 and the master cylinder 10 is positioned a booster 22 which increases the stepping force of the foot pedal. Therefore, the high hydraulic oil force can be generated by the stepping force of the brake pedal through the master cylinder 10 and the booster 22.

The hydraulic oil force of the booster 22 is transferred to the brake shoe 14 or the calliper 16, and friction force is generated between the brake shoe 14 or the calliper 16 and the drum 18 or the disk 20, to stop or reduce the revolution speed of the car wheel.

If different loads are applied crosswise along a car between the side wheels of the car, a biased brake forced is generated, particularly when a much larger load is applied to one of the side wheels. That is, one side wheel when less load is applied is more locked than the other side wheel by the hydraulic force supplied from the brake system. Therefore, for prohibiting the biased braking force, a hydraulic brake force regulating device is widely used in an automotive vehicle.

The prior brake hydraulic force regulating device as shown in FIG. 2, is composed of a spring lever 22 which is mounted on one side of the center portion of an axle housing 24, and a control spring 26 which is mounted between the axle housing 24 and the side frame 28 of the car body.

When the biased load is applied to the axle housing 24, the axle housing 24 is inclined to one side of the car body and the control spring 26 senses the inclination of the car body.

An operating lever 30 is provided on the control spring 26 and a hydraulic force regulating valve 32 being controlled by the operating lever 30 is provided on the oil line 34 through which the hydraulic brake oil is transferred from the master cylinder 10 to the wheel cylinder 21

If a biased load is applied on both side wheels, the one end of the axle housing 24 where less load is applied is raised upward. At this time, the operating lever 30 is actuated by the spring lever 22 and the control spring 26, and the hydraulic brake force regulating valve 32 is controlled by the operating lever 30 so that more brake hydraulic oil is transferred to the brake wheel cylinder where more load is applied.

Therefore, when a biased load is applied both wheels are braked by the same brake force. One wheel of the side wheels is not locked and biased brake force is prohibited, and safety braking can be expected.

However, since the prior brake system comprising the control spring 26 and the hydraulic brake regulating valve 32 is a mechanical mechanism, the exact operation of the hydraulic brake regulating valve can not be ensured.

SUMMARY OF THE INVENTION

Therefore, the present invention is made in an effort to solve the above described problems of the prior brake system for a vehicle.

It is an object of the present invention to provide an apparatus for controlling the brake oil pressure in the brake system of a vehicle, when a biased load is applied on both side wheels, both side wheels are braked by same hydraulic braking force and the exact operation can be ensured.

To achieve the above objectives, the present invention provides an apparatus for controlling the brake oil pressure in the brake system of a vehicle including a brake master cylinder generating hydraulic power by stepping on the brake pedal and, a wheel cylinder generating braking force by the friction between the brake shoe or the calliper and the drum or the disk operated by the hydraulic power comprising:

a pair of positioning sensors mounted on both ends of the center portion of the axle housing for sensing the position of the axle housing inclination when a biased load is applied on both side wheel;

an electric controller connected with the positioning sensors;

a control valve for controlling the hydraulic oil transferred from the master cylinder to the wheel cylinder; and a valve control means mounted between the electric controller and the control valve and controlling the control valve with the signal from the controller.

BRIEF DESCRIPTION OF THE INVENTION

The accompanying drawings, which are incorporated in and constitute a part of the specification, illustrate an embodiment of the invention and together with the description, serve to explain the principles of the invention:

DETAILED DESCRIPTION OF THE PREFERRED EMBODIMENT

Reference will now be made in detail to the presently preferred embodiment of the invention, an example of which is illustrated in the accompanying drawings. Wherever possible, the same reference numbers will be used throughout the drawings to refer to the same or like parts.

Figure 1:
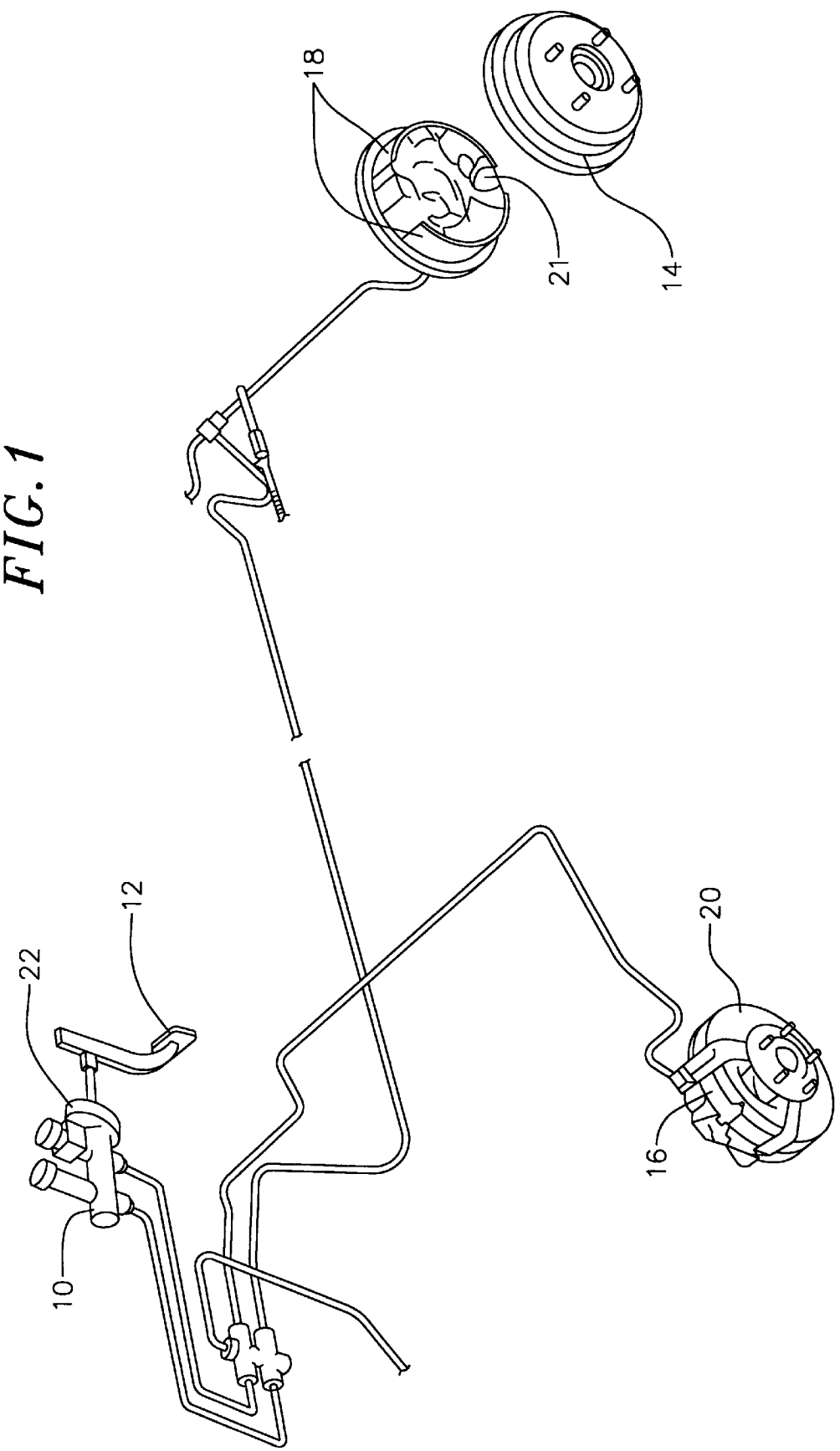
FIG. 1 is a perspective view of the general brake system for a car.
Figure 2:
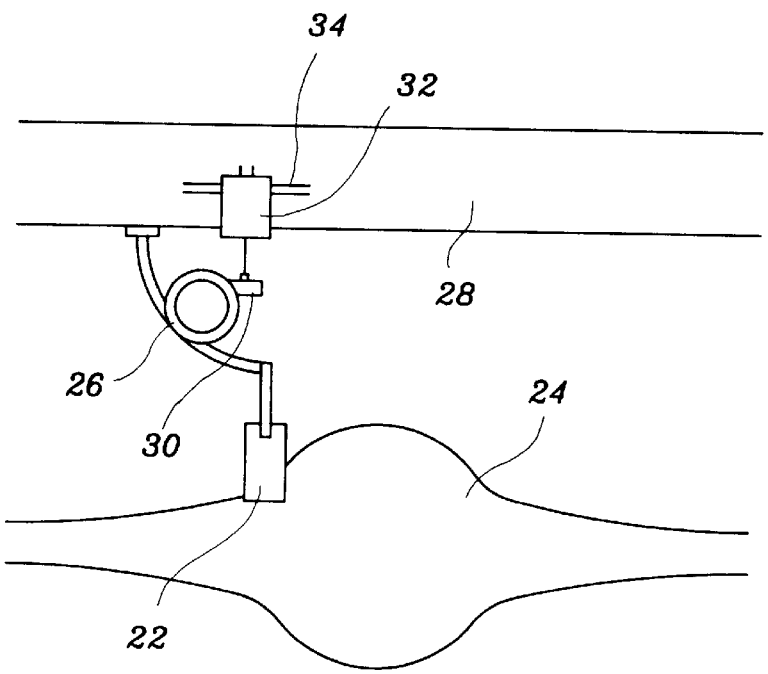
FIG. 2 is a side view of the prior hydraulic brake oil regulating device.

The hydraulic force regulating device according to the present invention is adapted to the general brake system for a car. The general brake system shown in FIG. 1 consists of a master cylinder 10 generating hydraulic pressure by stepping on the brake pedal 12, a brake shoe 14 or a calliper 16 which contacts with a drum 18 or a disk 20 of the car wheel and generates friction force, and a wheel cylinder 21 actuated by the hydraulic force from the master cylinder 10 and pushing the brake shoe 14 or the calliper 16 to the drum 18 or the disk 20.

Figure 3:
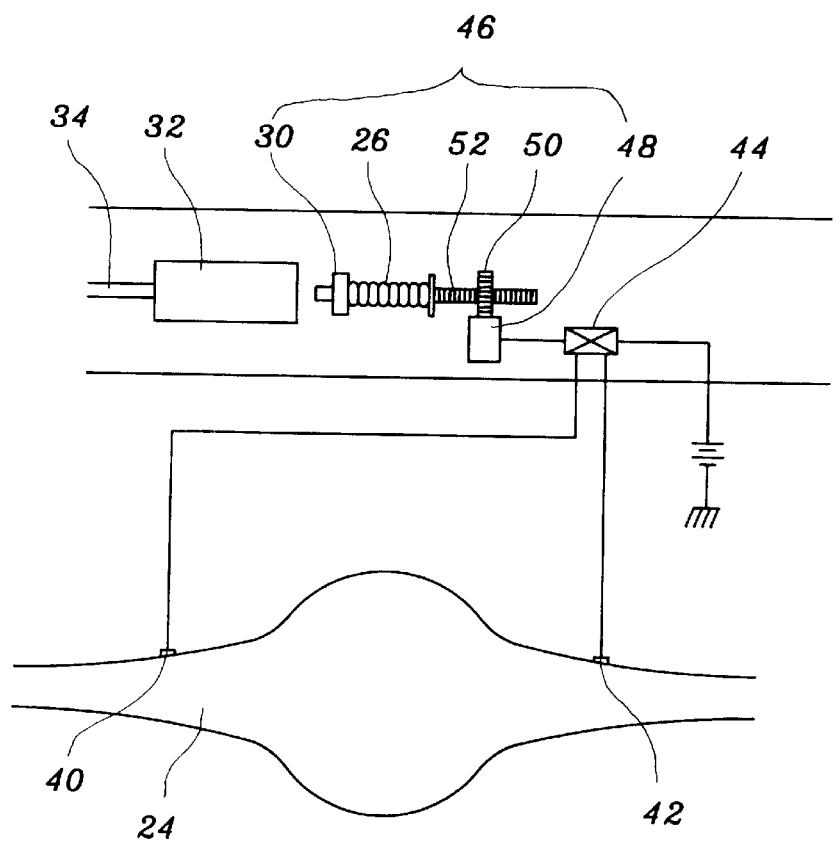
FIG. 3 is a side view of the hydraulic brake oil regulating device according to the present invention.
Figure 4:
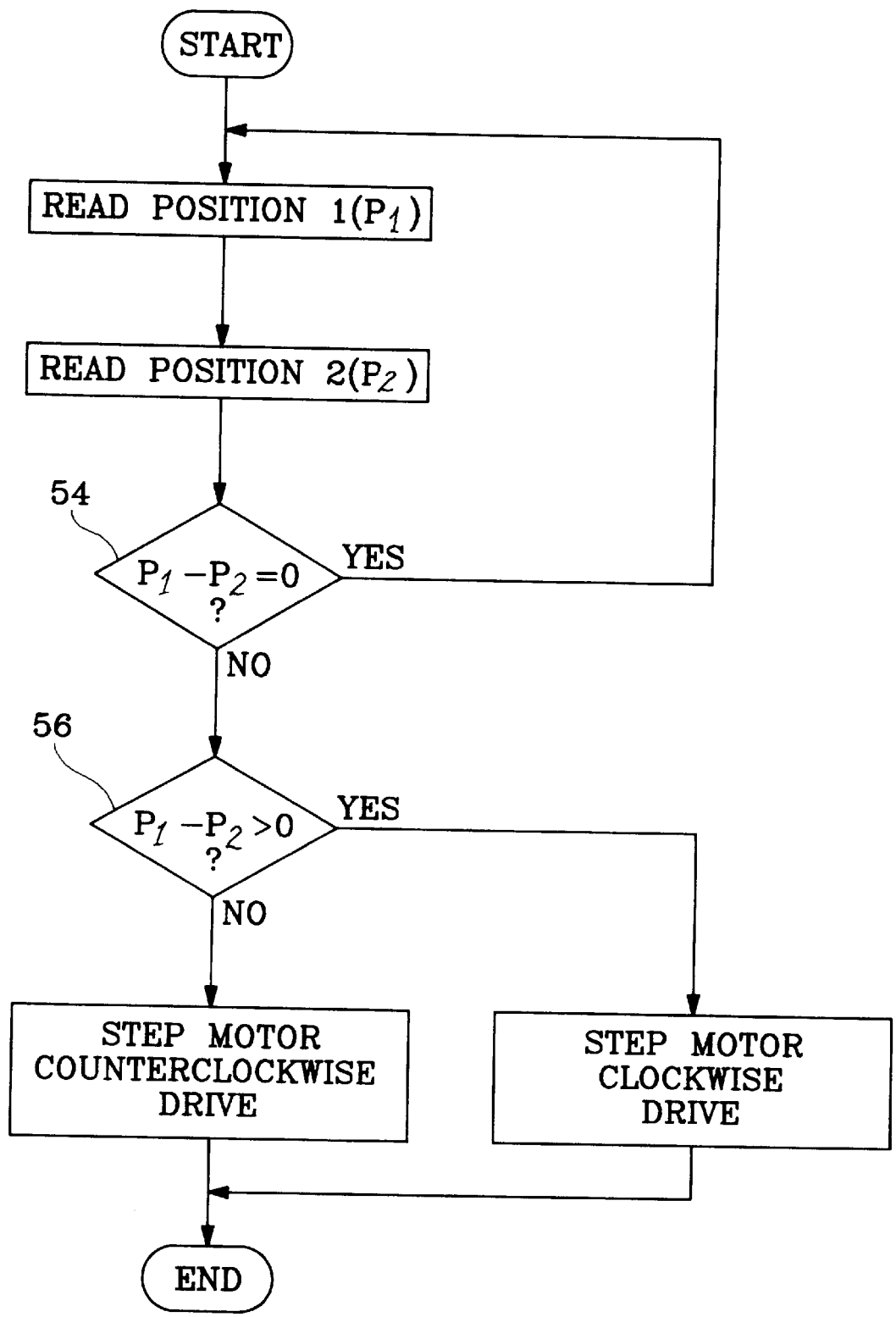
FIG. 4 is a flow chart for showing the operation of the hydraulic brake oil regulating device according to the present invention.

The hydraulic brake force regulating device according to the present invention is, as shown in FIG. 3, composed of a pair of position sensors 40, 42 which are mounted on both ends of an axle housing 24, respectively, and sense the position of the axle housing 24 which is inclined by the biased load applied on the car.

The position sensors 40, 42 are connected to an electric controller 44 receiving the sensed signal from the position sensor 40, 42 and outputting a signal corresponding to the position of the axle housing 24.

A valve control means 46 is connected with the electric controller 44 and controlled by the output signal from the controller 44.

The valve control means 46 consists of a step motor 48 which is actuated by the signal from the controller 44 during the predetermined time, a pinion 50 mounted on the shaft of the step motor 48, and a rack 52 which engages with the pinion 50 and operating an operating lever 32 through a control spring 26.

The operating lever 30 which is actuated by the rack 52 and the control spring 26 is mounted on the hydraulic brake force regulating valve 28. The hydraulic brake force regulating valve 28 is connected to the oil line 34, through which compressed brake oil is transferred from the master cylinder 10 to the wheel cylinder 21 equipped in each wheel of a car. Therefore the brake oil is controlled by the regulating valve 28.

In the present invention, when biased force is applied to both side wheels, the axle housing 24 is inclined to one side. The inclination of the axle housing 24 is sensed by the two sensors 40, 42, and the signals corresponding to load P1 and load P2 are inputted into the electric controller 44.

The difference between load P1 and load P2 is determined in the first decision portion 54 of the controller 44. If the difference between load P1 and load P2 is zero, the reading signal of the sensor 40, 42 are continuously inputted into the first portion 54 of the controller 44.

If the difference between load P1 and load P2 is not zero, however, the difference is determined in the second decision portion 56. Then, if the load P1 is larger than load P2, the step motor 48 is actuated clockwise by the output signal of the controller 44. And, if the load P2 is larger than load P1, the step motor 48 is actuated counterclockwise.

When the step motor 48 is actuated, the pinion 50 mounted on the shaft of the step motor 48 is simultaneously rotated. The rack 52 engaged with the pinion 50 is pushed by the revolution of the pinion 50 toward the brake oil regulating valve 32 or pulled against the valve 32. The brake oil regulating valve 32 is operated by the movement of the rack 52 transferred through the operating lever 26 and the control spring 26 and controls the flow rate of the oil line 34.

The brake oil regulating valve 32 supplies more oil to the wheel cylinder where more load is applied. Therefore, if a biased load is applied to the axle of a car, both wheels are braked by the same braking power, despite the fact that the load applied to one of the wheel cylinders is larger than the load applied to the other wheeled cylinder.

What is claimed is:

1. A hydraulic brake force regulating system for regulating the hydraulic oil transferred from a master brake cylinder of a vehicle to a pair of wheel brakes, each wheel brake being provided for one of a pair of wheels at opposite ends of an axle of the vehicle, the system comprising:

a pair of positioning sensors mounted on opposite sides of a center portion of a housing of the axle for sensing the inclination of the axle when a biased load is applied to the wheels;

an electric controller connected with the positioning sensors for providing a signal indicative of the inclination of the housing;

a control valve comprising an operating lever for controlling the hydraulic oil transferred from the master cylinder to the wheel brakes; and a valve control means mounted between the electric controller and the control valve for controlling the control valve with the signal from the controller, wherein the valve control means is a rack and pinion system connected to the operating lever.

2. The hydraulic brake force regulating system according to claim 1 wherein the control means further comprises a step motor coupled to the signal from the controller for driving the rack and pinion system.

3. The hydraulic brake force regulating system according to claim 2 wherein the rack and pinion system comprises a pinion mounted on a shaft of the step motor and a rack engaged with the pinion.

4. The hydraulic brake force regulating system according to claim 3 further comprising a control spring for connecting the rack to the operating lever.

5. A hydraulic brake force regulating system for regulating the breaking force applied to each of a pair of wheels brakes, each wheel brake at an opposite end of an axle of a vehicle, the system comprising:

a pair of positioning sensors mounted on opposite sides of a central housing of the axle to detect the inclination of the axle;

an electronic controller connected to the positioning sensors for providing a signal indicative of the inclination of the axle;

a valve for regulating the braking force applied by each of the wheels brakes; and a controller for controlling the valve based on the signal from the electronic controller such that substantially the same breaking force is applied by both wheel brakes, wherein the controller comprises a rack and pinion system, and a step motor coupled to the signal from the electronic controller for driving the rack and pinion system.

6. The hydraulic brake force regulating system according to claim 5 further comprising a control spring, and wherein the valve comprises an operating lever connected to the rack by the control spring.

* * * * *